United States Patent [19]

Fukuchi

[11] Patent Number: 5,434,888
[45] Date of Patent: Jul. 18, 1995

[54] FSK MODULATING APPARATUS
[75] Inventor: Akio Fukuchi, Tokyo, Japan
[73] Assignee: NEC Corporation, Tokyo, Japan
[21] Appl. No.: 103,854
[22] Filed: Aug. 9, 1993
[30] Foreign Application Priority Data Aug. 13, 1992 [JP] Japan .................................. 4-215881

[51] Int. Cl.6 .......................... H03C 3/00; H03K 7/06; H04L 27/12
[52] U.S. Cl. ........................................ 375/307; 331/2; 331/49; 375/376; 332/100
[58] Field of Search ...................... 375/45, 62, 66, 120; 332/100; 455/102, 110, 113; 331/2, 49, 45, 56

[56] References Cited

U.S. PATENT DOCUMENTS 3,993,868  11/1976  Balcewics ............................ 332/100
4,628,286  12/1986  Nossen ................................ 332/100
4,659,999   4/1987  Motoyama et al. ................... 375/66

FOREIGN PATENT DOCUMENTS 4320137  11/1992  Japan ................................. 332/100

Primary Examiner—Stephen Chin
Assistant Examiner—Don V. Vo
Attorney, Agent, or Firm—Ostrolenk, Faber, Gerb & Soffen

[57] ABSTRACT

An FSK modulating apparatus includes a first phase locked loop arrangement having a first voltage controlled oscillator for generating a space frequency signal of a modulation signal and a second phase locked loop arrangement having a second voltage controlled oscillator for generating a mark frequency signal of the modulation signal. The apparatus also includes a third voltage controlled oscillator used to produce an FSK modulated output signal. After input data changes frequency to a space frequency or a mark frequency, a control voltage for the phase locked loop arrangement that is associated with the resulting frequency is routed through a low pass filter having a flat group delay characteristic to the third voltage controlled oscillator. After a set period of time has elapsed, the third voltage controlled oscillator replaces the voltage controlled oscillator of the particular phase locked loop arrangement associated with the current state of the modulator signal.

7 Claims, 3 Drawing Sheets

FSK MODULATING APPARATUS

BACKGROUND OF THE INVENTION

The present invention relates to an FSK modulating apparatus applicable to a digital data communication system.

As shown in FIG. 1, a conventional FSK modulating apparatus comprises a voltage controlled oscillator (abbreviated as VCO hereinafter) 31 generating an oscillation signal S31 in a frequency band of 20 MHz, a variable (programmable) frequency divider 32 dividing the frequency of the oscillation signal S31 by 418 or 382 in accordance with a space or mark of input data Di to produce a divided output in a 50 KHz frequency band, a phase comparator 33 comparing phases of the divided output from the variable frequency divider 32 and a reference signal of 50 KHz to produce a control voltage for the VCO 31, a reference signal generator 3 generating the reference signal, a low pass filter 34 disposed between the phase comparator 33 and the VCO 31 for removing an undesired component for the phase locked loop operation, a frequency divider 35 dividing the frequency of the VCO 31 output signal by 200 and a low pass filter 36 removing an undesired component to deliver an output FSK modulated signal. The VCO generates an FSK modulation signal having 19.1 MHz in the mark or 20.9 MHz in the space.

It is a common practice according to the conventional FSK modulating apparatus of FIG. 1 to implement a filter having a first-order CR integration circuit as the low pass filter 34 of the phase locked loop. However, there are problems with this kind of filter in that attenuation of a high frequency component is not sufficient and that when the cut-off frequency of the filter is set higher to enhance the response of the PLL loop, the filter cannot sufficiently remove an undesired signal component. Should the response of the PLL loop be lowered, intersymbol interference would occur. The resultant intersymbol interference becomes an obstruction to achieving a high-speed data communication system. On the other hand, when the low pass filter is implemented with a higher-order filter, harmful oscillation or overshoot due to the filter delay is apt to occur. In addition, such implementation suffers from jitter since the divisor of the variable frequency divider is set every period of the phase comparison frequency.

SUMMARY OF THE INVENTION

An object of the present invention is to provide an FSK modulating apparatus capable of generating an FSK modulated signal having a stable frequency characteristic and free from intersymbol interference and, therefore, feasible for a high-speed data communication system.

According to the present invention, there is provided an FSK modulating apparatus comprising: a plurality of phase locked loop arrangements each having a first voltage controlled oscillator (VCO) for generating a predetermined frequency signal associated with each state of a modulation signal, the first VCO of each of the plurality of phase locked loop arrangements receiving a control voltage under phase locked loop operation; a low pass filter having a flat group delay characteristic; and a second VCO for generating an FSK modulated signal, wherein the second VCO receives through the low pass filter the control voltage applied to the first VCO of the one of the plurality of phase locked loop arrangements that is associated with a resultant state of the modulation signal when the state of said modulation signal is changed, and, after a predetermined period, the first VCO in the phase locked loop arrangement associated with the resultant state of the modulation signal is replaced with the second VCO.

DETAILED DESCRIPTION OF THE PREFERRED EMBODIMENT

Figure 2:
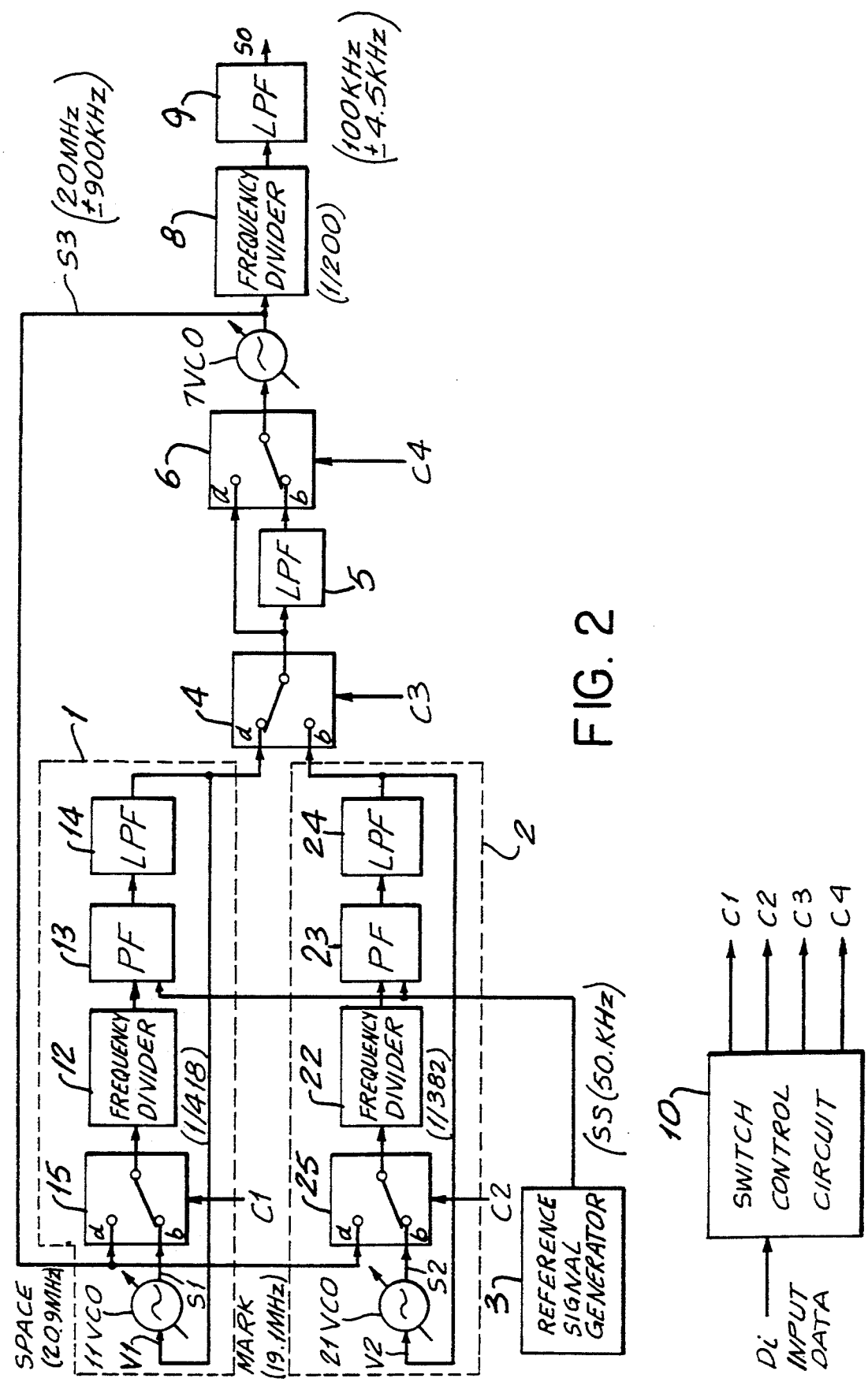
FIG. 2 is a block diagram showing an embodiment according to the present invention.

With reference to FIG. 2, an embodiment of the present invention comprises a phase locked loop arrangement 1 including a voltage controlled oscillator (abbreviated as VCO hereinafter) 11 and generating an oscillation signal S1 corresponding to a space, a phase locked loop arrangement 2 including a VCO 21 and generating an oscillation signal S2 corresponding to a mark, a reference signal generator 3 generating a reference signal Ss to be fed to the phase locked loop arrangements 1 and 2, a switch 4 selecting either of a control voltage for the VCO 11 and a control voltage V2 for the VCO 21, a low pass filter 5 having a flat group delay characteristic and removing an undesired signal component, a switch 6 selecting either of the output of the switch 4 and the output of the low pass filter 5, a VCO 7 generating an oscillation signal S3, which is controlled by the output of the switch 6, a frequency divider 8 dividing the frequency of the oscillation signal S3 from the VCO 7, and a low pass filter 9 removing an unnecessary signal component from the output signal of the frequency divider 8 to deliver an output FSK modulated signal. The phase locked loop arrangements 1 and 2 include, in addition to the VCOs 11 and 21, switches 15 and 25, frequency dividers 12 and 22, phase comparators 13 and 23, and low pass filters 12 and 24, respectively. A switch control circuit 10 delivers switching control signals C1, C2, C3 and C4 to the switches 15, 25, 4 and 6, respectively, depending on transition of input data Di (the space and mark). According to the present invention, the VCOs 7, 11 and 21 are designed to have the same characteristic. To this end, the VCOs 7, 11, and 21 have the same circuit configuration in the embodiment.

The operation of the illustrative embodiment will be described hereinafter. In FIG. 2, the output FSK modulation signal So is assumed to have a frequency of 104.5 kHz (100 kHz plus 4.5 kHz) in the case of a space or a frequency of 95.5 kHz (100 kHz minus 4.5 kHz) in the case of mark. Similarly, it is assumed that the VCOs 11, 21 and 7 have a capacity to oscillate at a frequency in a range from 19 MHz to 21 MHz. Particularly, the oscillation frequencies of the VCOs 11 and 21 are designated to 20.9 MHz (space) and 19.1 MHz (mark), respectively. Further, let the frequency of the reference signal Ss be 50 kHz.

To begin with, the operations of the phase locked loop arrangements 1 and 2 will be described. In the arrangements, each phase locked loop is set up when the switches 15 and 25 select a contact b. At this instant, the output signals of the VCOs 11 and 21 (20.9 MHz and 19.1 MHz, respectively) are respectively divided by 418 and 382 by the associated frequency dividers 12 and 22 to have a frequency of 50 kHz. Each of the phase comparators 13 and 23 compares the phase of the output signal of the associated frequency divider 12 and 22 with the phase of the reference signal Ss (50 kHz) and produces a voltage corresponding to the phase difference. Each of the low pass filters 14 and 24 removes an undesired signal component appearing on the associated phase locked loop, thereby producing the control voltage V1 for the VCO 11 and the control voltage V2 for the VCO 21, respectively.

In the case of a steady mark state wherein the input data Di is the mark and a predetermined period of time has elapsed after the change of the input data Di to the mark, the switches are controlled to have respective positions shown in FIG. 2. Specifically, the switch 25 in the phase locked loop arrangement 2 selects a contact a, i.e., the oscillation signal S3 of the VCO 7 by the switching control signal C2. Further, in accordance with the switching control signals C3 and C4, the switches 4 and 6 select a contact b (the control voltage V2 in the phase locked loop arrangement 2) and a contact a (the direct output from the switch 4), respectively. As a result, a phase locked loop is set up with the VCO 7 instead of the VCO 21. In response to the control voltage V2, the VCO 7 outputs the oscillation signal S3 having the frequency of 19.1 MHz (mark). The frequency of the signal S3 is divided by 200 by the frequency divider 8. The low pass filter 9 removes the unnecessary signal component from the resulting output of the frequency divider 8, thereby producing the output FSK modulated signal So having the frequency of 95.5 kHz (100 kHz 4.5 kHz) corresponding to the mark.

Figure 1:
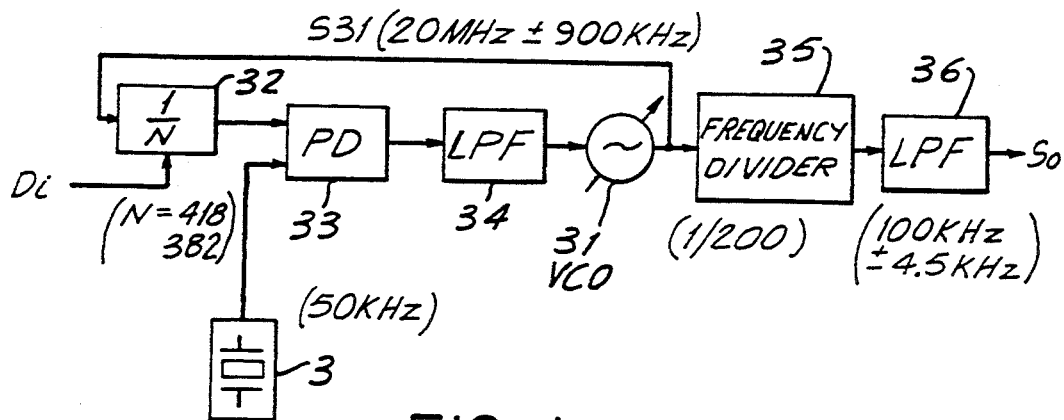
FIG. 1 is a schematic block diagram showing a conventional FSK modulating apparatus.
Figure 4:
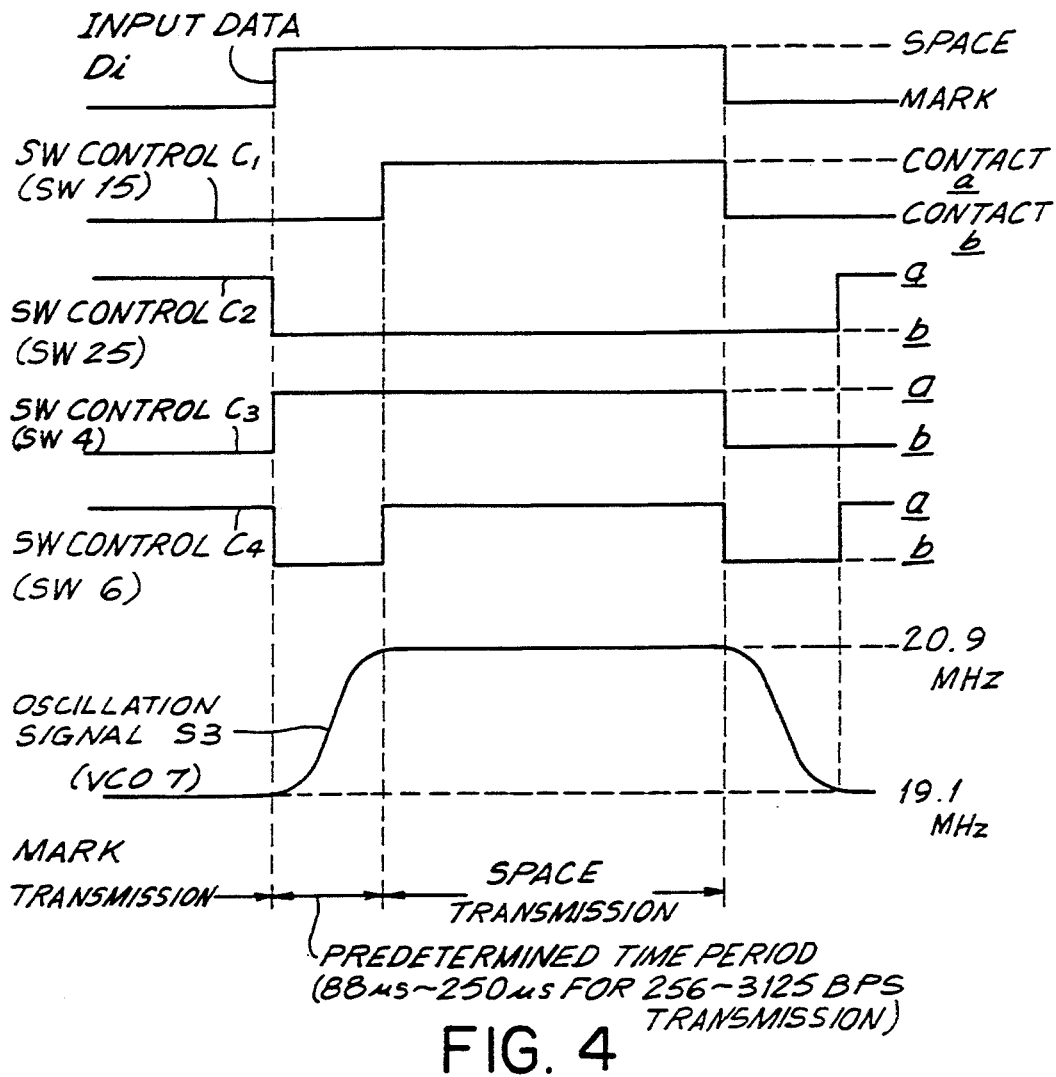
FIG. 4 is a timing chart demonstrating the operation of the embodiment shown in FIG. 2.
Figure 3:
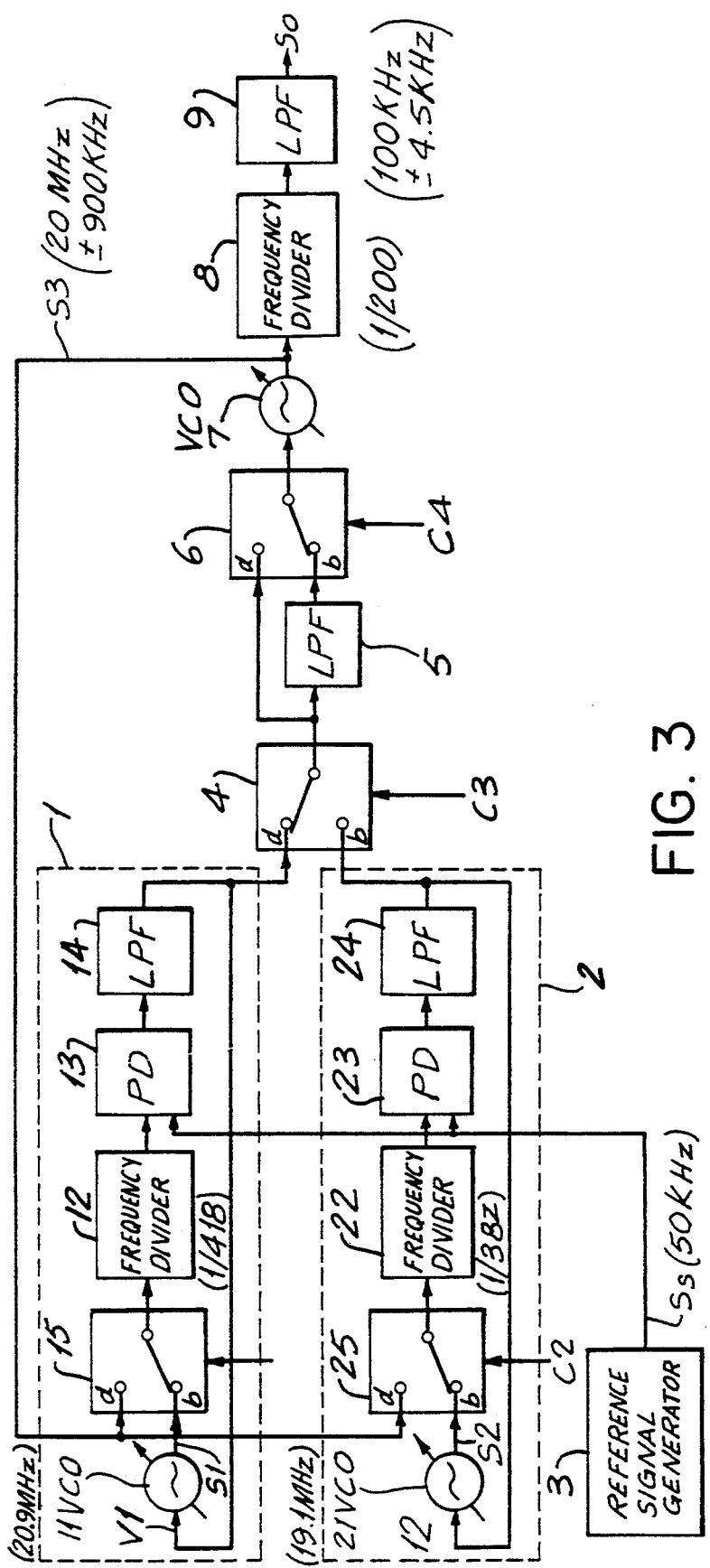
FIG. 3 also shows the embodiment of the present invention having a selection state wherein input modulating data has just changed from a mark to a space.
Figure 3:
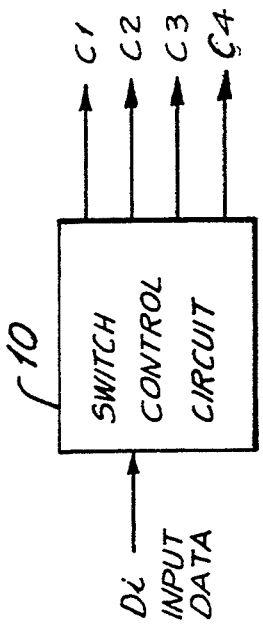

The embodiment operates on the change of the input data Di from the mark to the space as follows. FIG. 3 shows selection states of the switches wherein the input data Di has just changed from the mark to the space. FIG. 4 is a timing chart representative of this operation. In this change, the switch 15 in the phase locked loop arrangement 1 remains in contact with the contact b and the switch 25 in the phase locked loop arrangement 2 turns to select the contact b. The VCO 11 in the arrangement 1 is controlled by the control voltage V1 to continuously generate the frequency of 20.9 MHz. On the other hand, the switch 4 also turns to select the control voltage V1 in the phase locked loop arrangement 1 in response to the switching control signal C3 while the switch 6 selects the output of the low pass filter 5 in response to the switching control signal C4. As a result, the control voltage V1 is routed through the low pass filter 5 to the VCO 7. Accordingly, the frequency generated by the VCO 7 is shifted from the mark frequency (19.1 MHz) to the space frequency (20.9 MHz). Further, by using a Bessel type low pass filter having a flat group delay characteristic as the low pass filter 5, low pass filter 5 feeds a smoothly changing control voltage to the VCO 7. Since the VCOs 11, 21 and 7 are identical in characteristic, the frequency of the output signal S3 from the VCO 7 is smoothly changed from 19.1 MHz (mark) to 20.9 MHz (space), as shown in FIG. 4.

After the elapse of the predetermined period of time, the output of the low pass filter 5 becomes a steady space state, i.e., the oscillation frequency of the VCO 7 has approached 20.9 MHz. Then, the switch 15 in the phase locked loop arrangement 1 turns to select the contact a, i.e., the oscillation signal S3, in response to the switching control signal C1. Further, the switch 6 turns back to select the output of the switch 4 in response to the switching signal C4. Consequently, a phase locked loop including the VCO 7 is set up to allow the VCO 7 to accurately generate the oscillation signal S3 having a frequency 20.9 MHz (space).

The oscillation signal S3 controlled as stated above is frequency-divided by 200 by the frequency divider 8 and, then, processed by the low pass filter 9. As a result, the output FSK modulated signal So having the frequency of 104.5 kHz (100 kHz+4.5 kHz) is obtained.

When the input data Di is changed from the space to the mark, a similar switching operation is performed in response to the switching control signals $C_1 \sim C_4$ as shown in FIG. 4.

Though the above-described embodiment is the binary (2-level) FSK modulating apparatus, the present invention can be applied to a multilevel FSK modulating apparatus. To realize a four-level FSK modulating apparatus, for example, four phase locked loop arrangements, each generating respective oscillation frequencies and having the same circuit configuration of the arrangement 1 (2) in FIG. 2, are provided and the four outputs thereof are supplied to the switch 4. In this connection, the switching control signal $C_3$ for the switch 4 and switching control signals for switches (corresponding to the switch 15 (25) in FIG. 2) in respective four phase locked loop arrangements are accordingly modified.

As described above, in accordance with the present invention, the FSK modulating apparatus having a stable frequency characteristic and free from intersymbol interference and, therefore, feasible for a high-speed data communication system is obtained by providing three voltage controlled oscillators having the same characteristic. The first voltage controlled oscillator is provided in the first phase locked loop arrangement functioning to generate a space-frequency. The second voltage controlled oscillator is provided in the second phase locked loop arrangement functioning to generate a mark-frequency. The third voltage controlled oscillator is used to produce an FSK modulated output signal. Just after the input data has changed to the space or the mark, a control voltage for a phase locked loop arrangement associated with the resulting frequency is routed through a low pass filter having a flat group delay characteristic to the third voltage controlled oscillator. After a predetermined period of time has elapsed, the third voltage controlled oscillator is connected in place of the voltage controlled oscillator of the above-mentioned phase locked loop arrangement.

What is claimed is:
1. An FSK modulating apparatus comprising:
  a plurality of phase locked loop arrangements each having a first voltage controlled oscillator for generating a frequency signal associated with one of a plurality of states of a modulation signal, said first voltage controlled oscillator of each of said plurality of phase locked loop arrangements receiving a control voltage under a phase locked loop operation;
  low pass filter means having a flat group delay characteristic;
  a second voltage controlled oscillator for generating an FSK modulated signal, wherein when a state of the modulation signal changes to a new state, said second voltage controlled oscillator and one of said plurality of phase locked loop arrangements for generating a frequency signal associated with the new state of the modulation signal are connected to the low pass filter means such that said second voltage controlled oscillator receives through said low pass filter means the control voltage applied to the first voltage controlled oscillator contained in said one of said plurality of phase locked loop arrangements; and means for disconnecting the first voltage controlled oscillator contained in said one of said plurality of phase locked loop arrangements from the second voltage controlled oscillator and the low pass filter means and connecting said second voltage controlled oscillator in a new phase locked loop arrangement so that said second voltage controlled oscillator generates the frequency signal associated with the new state of the modulation signal.

2. An FSK modulating apparatus comprising:

a plurality of phase locked loop arrangements each including a first voltage controlled oscillator for generating an oscillation signal, a first selecting means for selecting one of said oscillation signal and an output frequency signal, a frequency divider for dividing a frequency of a signal output by said first selecting means, and a phase comparator for comparing phases of a frequency-divided signal output from said frequency divider and a reference signal to produce a control signal for said first voltage controlled oscillator;

second selecting means for selecting one of the control signals delivered from said plurality of phase locked loop arrangements;

a low pass filter for receiving an output from said second selecting means;

third selecting means for selecting one of an output of said low pass filter and the output from said second selecting means; and a second voltage controlled oscillator for generating said output frequency signal in response to an output from said third selecting means, wherein said plurality of phase locked loop arrangements each generating a frequency signal associated with one of a plurality of states of a modulated signal, said first selecting means in each of the phase locked loop arrangements delays selecting said output frequency signal output from the second voltage controlled oscillator when a state of the modulation signal associated with the respective phase locked loop arrangement is newly inputted, said second selecting means selects the control signal of one of the phase locked loop arrangements that is associated with the state of the modulation signal that is newly inputted for achieving a state change of the modulation signal, and said third selecting means selects the output delivered from said low pass filter during a period when the state change of the modulation signal occurs.

3. An FSK modulating apparatus comprising:

a first phase locked loop arrangement including a first voltage controlled oscillator for generating a first frequency signal in response to a first control signal, a first selector for selecting one of said first frequency signal and an output frequency signal, a first frequency divider for dividing a frequency of a first selected signal output from said first selector by a first divisor, and a first phase comparator for comparing phases of a first frequency-divided signal output from said first frequency divider and a reference signal to produce said first control signal;

a second phase locked loop arrangement including a second voltage controlled oscillator for generating a second frequency signal in response to a second control signal, a second selector for selecting one of said second frequency signal and said output frequency signal, a second frequency divider for dividing a frequency of a second selected signal output from said second selector by a second divisor, and a second phase comparator for comparing phases of a second frequency-divided signal output from said second frequency divider and said reference signal to produce said second control signal;

a third selector for selecting one of said first control signal and said second control signal to deliver a selected control signal;

a low pass filter for filtering said selected control signal output from said third selector to produce a filtered control signal;

a fourth selector for selecting one of said filtered control signal from said low pass filter and said selected control signal from said third selector to deliver a third control signal;

a third voltage controlled oscillator for generating said output frequency signal in response to said third control signal output from said fourth selector; and selection controlling means for controlling said first, second, third, and fourth selectors in accordance with a modulation signal, wherein said first and second frequency signals are associated with first and second states of said modulation signal, respectively, said first and second selectors select said output frequency signal after a time delay when a new state of the modulation signal is inputted and the new state corresponds to the frequency signal generated by a respective one of the first and second phase locked loop arrangements, said third selector selects a control signal output by the respective one of the first and second phase locked loop arrangements when the state of the modulation signal is changed, and said fourth selector selects said filtered control signal during a period when the state of the modulation signal is changed.

4. An FSK modulating apparatus as claimed in claim 3, wherein said first and second frequency signals are associated with in an FSK modulation signal, respectively.

5. An FSK modulating apparatus as claimed in claim 3, wherein said low pass filter has a flat group delay characteristic.

6. An FSK modulating apparatus as claimed in claim 3, further comprising:

a third frequency divider for dividing said output frequency signal to produce a resultant FSK modulated signal.

7. An FSK modulating apparatus as claimed in claim 3, wherein said first, second and third voltage controlled oscillators have substantially the same frequency characteristic.

* * * * *